United States Patent

Adachi et al.

Patent Number: 5,887,000
Date of Patent: Mar. 23, 1999

[54] CENTRALIZED TEST APPARATUS FOR ATM EXCHANGE SYSTEM

[75] Inventors: Hiroshi Adachi; Nobuhiko Eguchi; Hiroyuki Kudo, all of Fukuoka, Japan

[73] Assignee: Fujitsu Limited, Kanagawa, Japan

[21] Appl. No.: 966,574

[22] Filed: Nov. 10, 1997

Related U.S. Application Data

[63] Continuation of Ser. No. 505,624, Jul. 21, 1995, abandoned.

[30] Foreign Application Priority Data

Jul. 25, 1994 [JP] Japan .................................. 6-172530

[51] Int. Cl.$^6$ .......................... G01R 31/28; G01R 31/08; H04L 12/28
[52] U.S. Cl. .......................... 371/20.1; 370/241; 370/392
[58] Field of Search .................. 371/20.1, 20.5; 370/13, 14, 15, 16.1, 91, 94.2, 240.241, 242, 244, 245, 248, 252, 253, 30, 34, 389, 390, 392, 395, 396, 397, 351, 352, 353, 354, 355, 356

[56] References Cited

U.S. PATENT DOCUMENTS

| | | | |
|---|---|---|---|
| 5,119,367 | 6/1992 | Kawakatsu et al. | 370/94.1 |
| 5,142,653 | 8/1992 | Schefts | 370/244 |
| 5,153,578 | 10/1992 | Izawa et al. | 370/94.2 |
| 5,257,311 | 10/1993 | Naito et al. | 370/94.1 |
| 5,313,453 | 5/1994 | Uchida et al. | 370/248 |
| 5,315,588 | 5/1994 | Kajiwara et al. | 370/60.1 |
| 5,491,697 | 2/1996 | Tremel et al. | 371/5.1 |
| 5,504,754 | 4/1996 | Grunenfelder | 371/20.1 |

*Primary Examiner*—Trinh L. Tu
*Attorney, Agent, or Firm*—Helfgott & Karas PC

[57] ABSTRACT

A centralized test apparatus is provided for an ATM exchange system. The test apparatus monitors cells transmitted through a specified line connected to an office unit of the exchange system or through a specified path in the exchange system, and measures the traffic of the specified line or path. The test apparatus has an instruction unit for issuing an instruction to test a cell transmitted through the specified line or path, a destination changer arranged in the office unit, for changing the destination header of the cell according to an instruction from the instruction unit, so that the destination header indicates a tester, a switching unit for guiding the cell to the tester according to the header, and the tester fixed in the exchange system, to centrally monitor and test the cell.

18 Claims, 23 Drawing Sheets

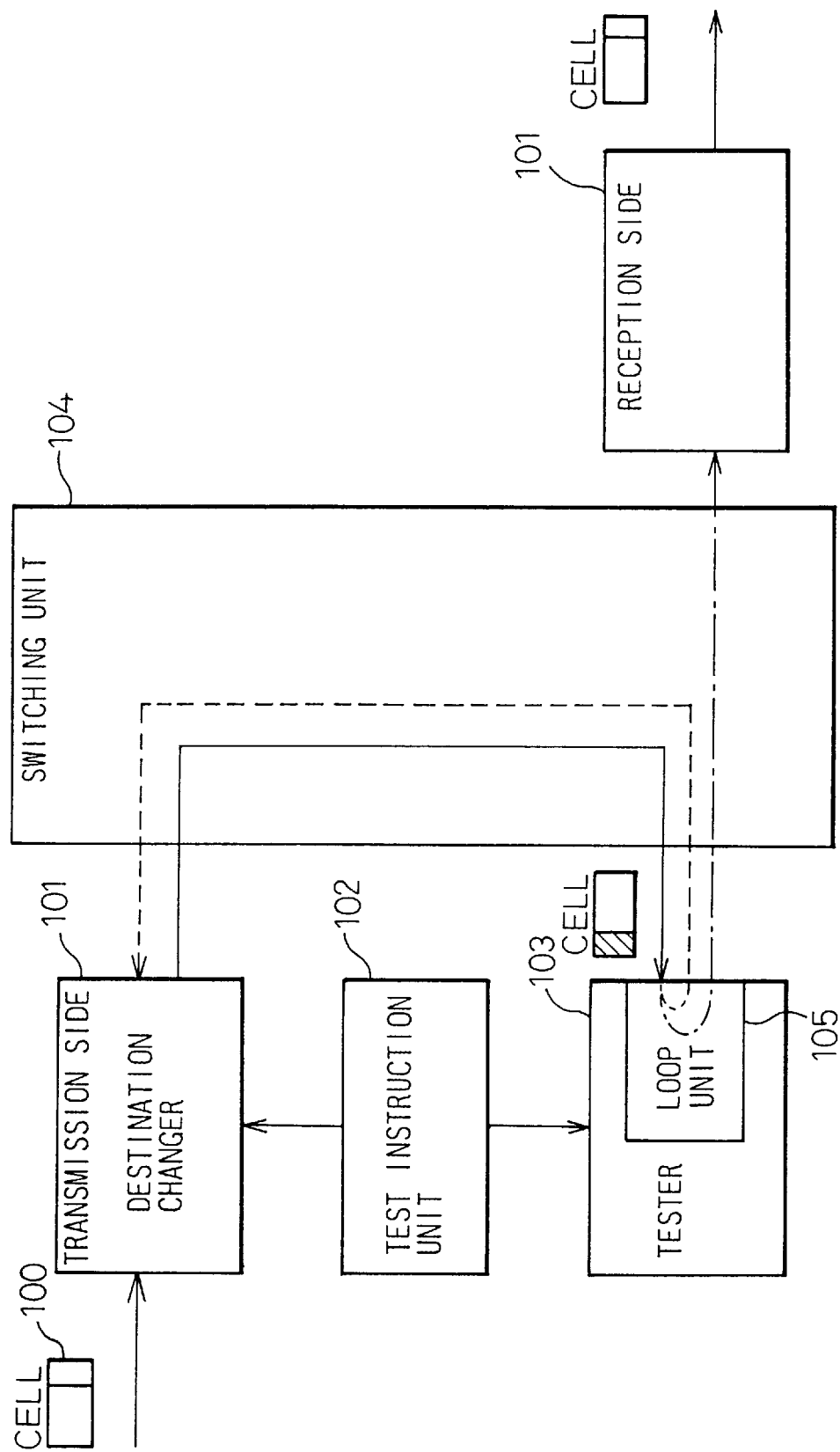

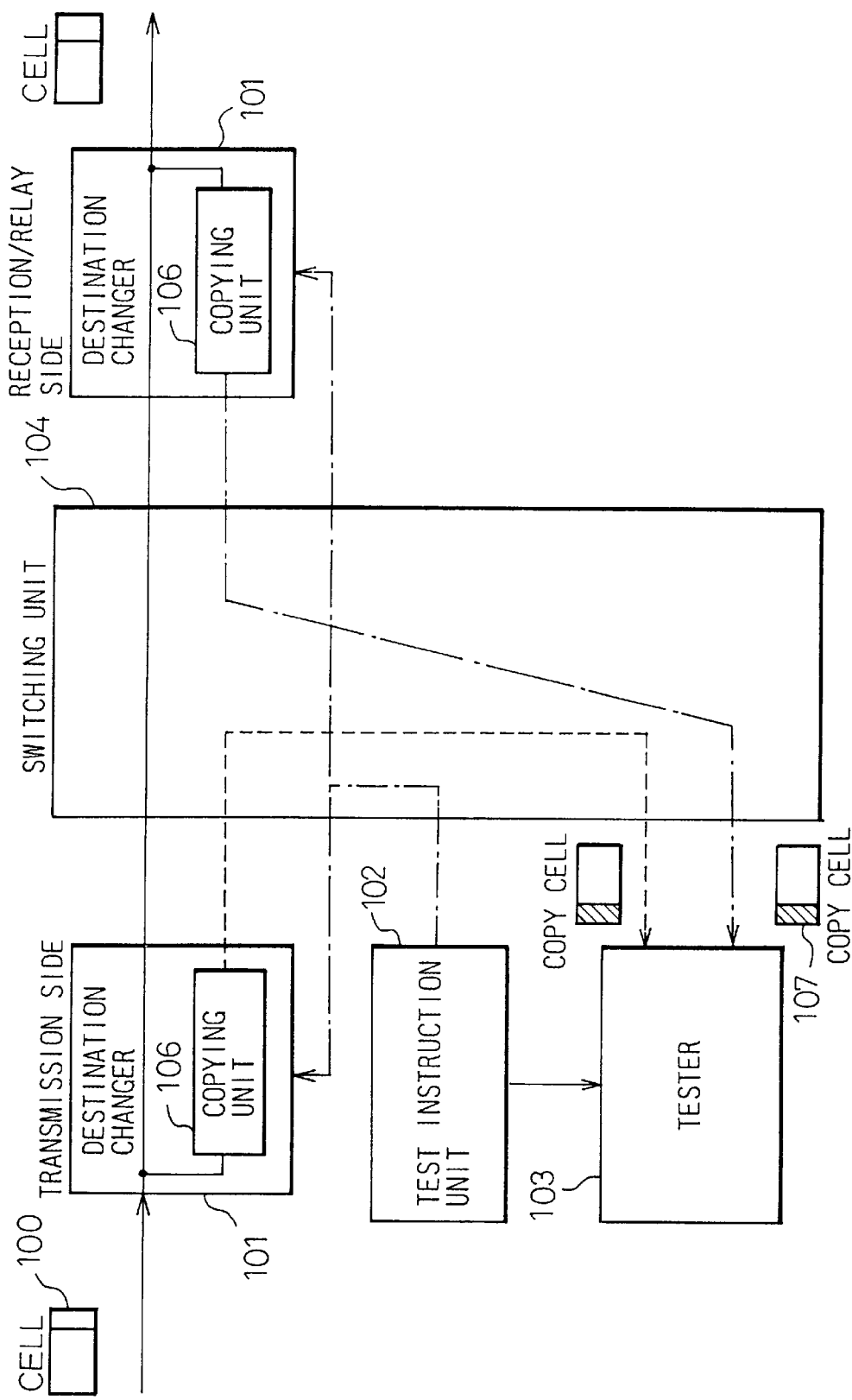

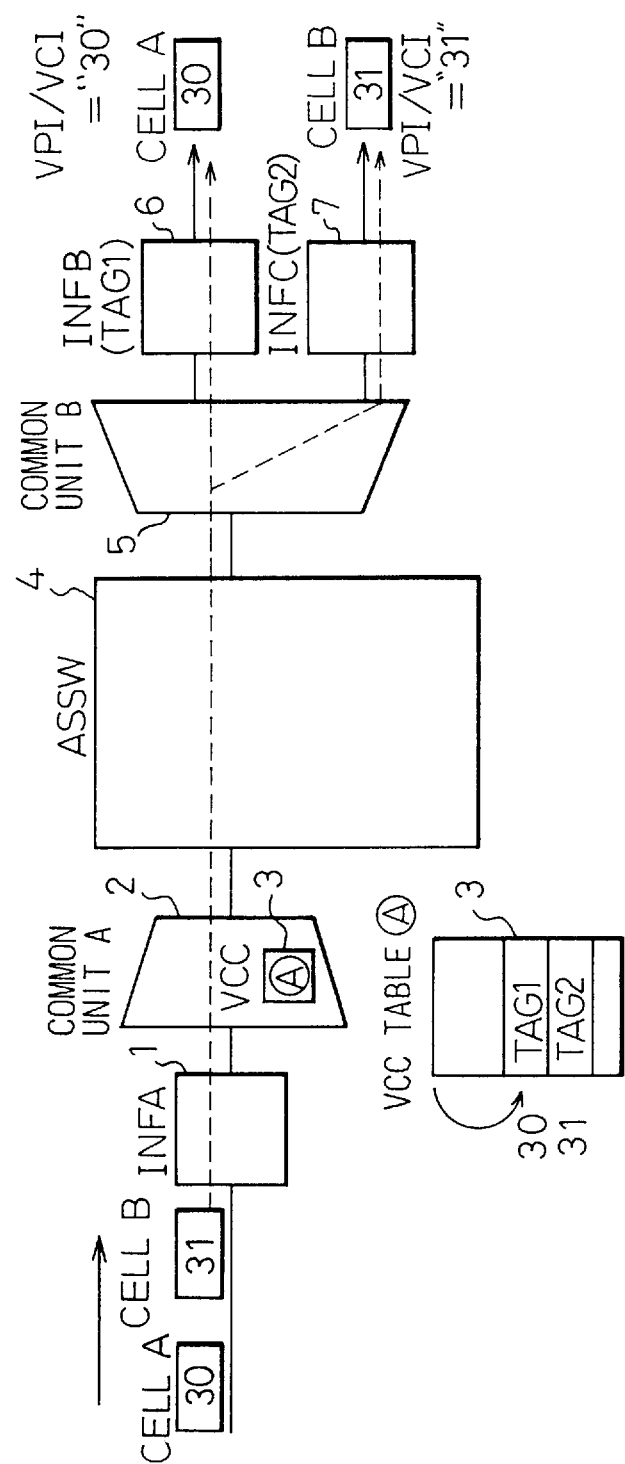

Fig. 5

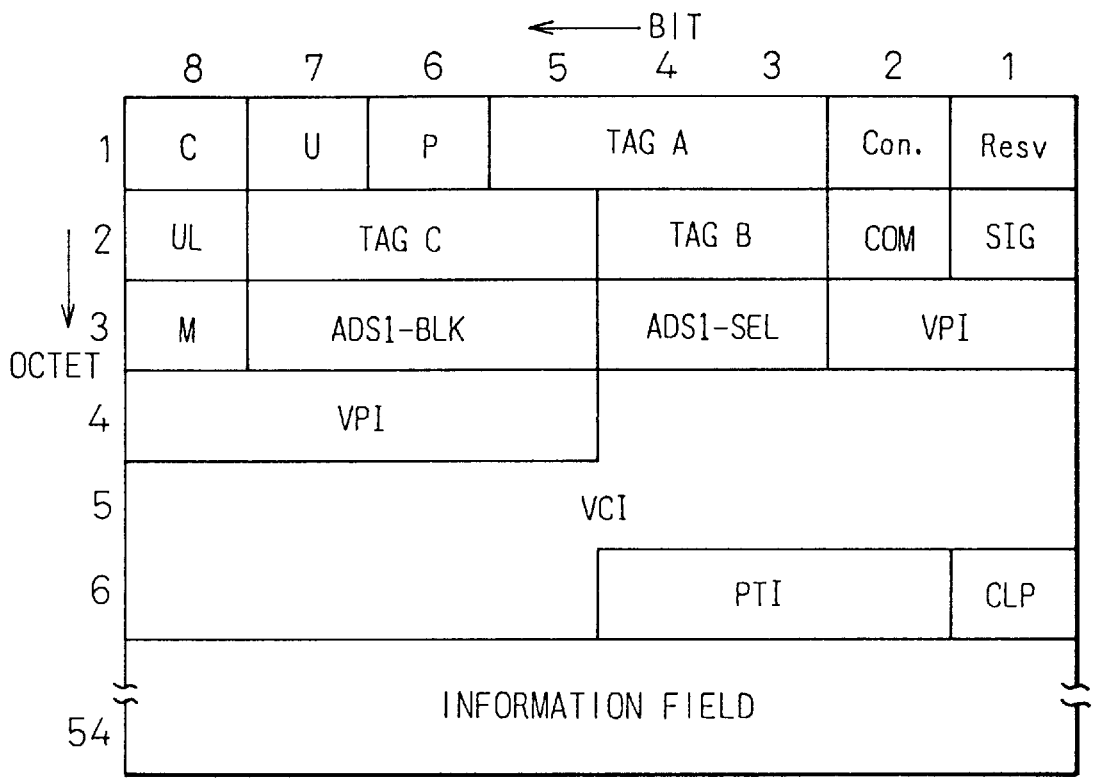

C=0/1: ONE-TO-ONE OR ONE-TO-N COMMUNICATION MODE
U=0/1: 0=USER CELL, 1=INTERNAL TEST CELL
P: QUALITY
TAG A: TAG FOR SELECTING ONE OF 2.4-G 4X4 WAYS IN SW
CON: PRIORITY CLASS
Resv: RESERVED BIT
UL: SIFSH SERIES CONNECTION HIGH/LOW SELECTION BIT
TAG C: TAG FOR SELECTING ONE OF LINES IN SIFSH
TAG B: TAG FOR SELECTING ONE OF 4 WAYS FROM 2.4-G
       HW TO 600-M HW
COM: SELECTION BIT FOR SIFSH COMMON UNIT
SIG: SIGNALING CELL INDICATION BIT
M: SW IN/OUT BIT
VPI: VIRTUAL PATH IDENTIFIER
VCI: VIRTUAL CHANNEL IDENTIFIER
PTI: PAYLOAD TYPE
CLP: CELL LOSS PRIORITY
ADSI-BLK, ADSI-SEL: TAGS USED BY ADSI

Fig. 7

ADRESS                                                                                      (C=0)

| | | | | |
|---|---|---|---|---|
| 0 | EN | LN | VPI | VCI |
| 1 | EN | LN | VPI | VCI |
| 2 | EN | LN | VPI | VCI |
| ⋮ | ⋮ | ⋮ | ⋮ | ⋮ |
| 4076 | EN | LN | VPI | VCI |

203

ICID − A = "2"

Fig. 8

| ADRESS | | | | | 205 | |
|---|---|---|---|---|---|---|
| 0 | EN | TAG A | TAG B | TAG C | | VPI/VCI |
| 1 | EN | TAG A | TAG B | TAG C | | VPI/VCI |
| 2 | EN | TAG A | TAG B | TAG C | | VPI/VCI |
| ... | | | | | | |
| 4096 | EN | TAG A | TAG B | TAG C | | VPI/VCI |

⇦ ICID−A = "2"

Fig. 15

| ADRESS | | | | | (C=1) |
|---|---|---|---|---|---|
| 0 | EN | TAG A | TAG B | TAG C | ICID-B |
| 1 | EN | TAG A | TAG B | TAG C | ICID-B |
| 2 | EN | TAG A | TAG B | TAG C | ICID-B |
| --- | | | | | |
| 4096 | EN | TAG A | TAG B | TAG C | ICID-B |

ICID-A = "2"

Fig. 16

| ADDRESS | EN | HW15 | ... | HW01 | HW00 |
|---|---|---|---|---|---|
| 0000 | EN | HW15 | ... | HW01 | HW00 |
| 0001 | EN | HW15 | ... | HW01 | HW00 |
| 0002 | EN | HW15 | ... | HW01 | HW00 |
| ... | | | | | |
| FFFF | EN | HW15 | ... | HW01 | HW00 |

302

VALID/INVALID=1/0

ICID-B ="2"

Fig.18

| ADRESS | EN | OVPI | OVCI | N-ADD | E-F |
|---|---|---|---|---|---|
| 000 | EN | | | | |
| 001 | EN | A | A' | 2 | 0 |
| 002 | EN | B | B' | 3 | 0 |
| 003 | EN | C | C' | — | 1 |
| ... | | | | | |
| OFF | EN | | | | |

308

⇐ ICID-C ="1"

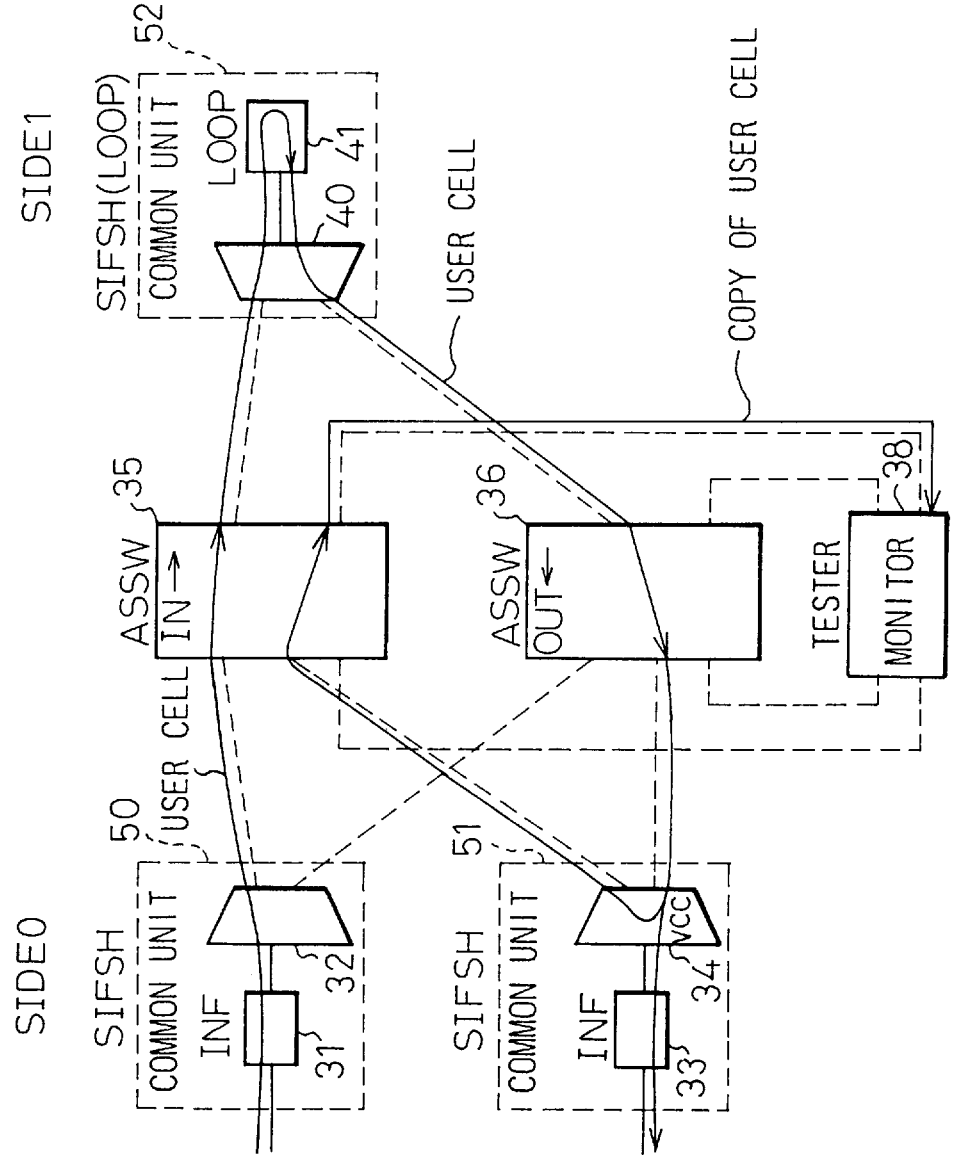

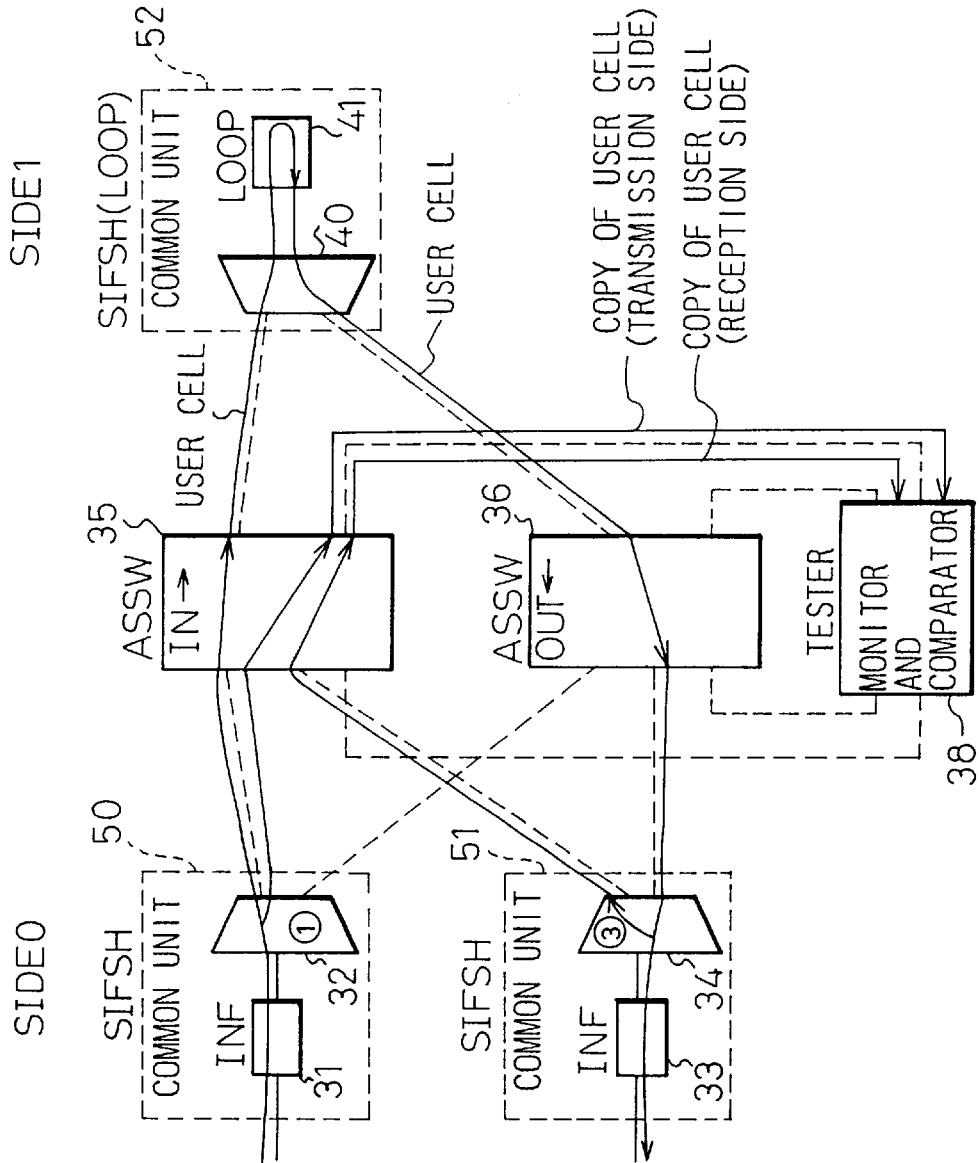

CENTRALIZED TEST APPARATUS FOR ATM EXCHANGE SYSTEM

This is a continuation of application Ser. No. 08/505,624, filed Jul. 21, 1995, now abandoned.

BACKGROUND OF THE INVENTION

1. Field of the Invention

The present invention relates to an ATM (asynchronous transfer anode) exchange system, and particularly, to a centralized test apparatus for an ATM exchange system, capable of centrally monitoring and testing cells transferred through a given line or path of the exchange system, or measuring the traffic of the line or path.

2. Description of the Related Art

One of the methods of testing an ATM exchange system is a loop test. The loop test employs a test cell generator that generates a test cell. The test cell is looped by a loop unit and is guided to a target route in the exchange system. Thereafter, the test cell is received by a receiver, which checks the test cell to see whether or not the target route is sound.

This kind of loop test is disclosed in, for example, Japanese Patent Application No. H05-177822 "Loop Test Method of ATM Exchange System," No. H02-243841 "Conduction Test Method of ATM Exchange Channel," and No. H02-336400 "Loop Test Method."

In addition to the function of testing channel conductivity, the ATM exchange system must have an OAM function of monitoring the quality of connection in an ATM layer, The details of this function are being studied in ITU-T (previous CCITT), To monitor a line, it is usual to connect a measuring device to a digital signal cross connector (DSX) of the exchange system.

A console is used to enter various instructions to maintain and operate the exchange system. When testing a given line of the exchange system, the console is used to enter test conditions. Then, the cross connector that physically terminates subscriber optical fiber lines is manipulated to open the target line, and the measuring device is connected to the target line.

The console is usually far from the cross connector, and therefore, a maintenance person must come and go between them when inspecting a given line, In this way, the prior art is inconvenient for maintenance persons.

In addition, the prior art is slow and inefficient because disconnecting a target line at the cross connector and connecting the measuring device to the target line need a lot of manpower.

SUMMARY OF THE INVENTION

An object of the present invention is to provide a test apparatus for an ATM exchange system, which enables a maintenance person to specify a line or channel through a console so that the exchange system may automatically route the line or channel to a tester fixed in the exchange system, to test and simulate the line or channel.

Another object of the present invention is to provide a test apparatus for an ATM exchange system, which makes a copy of a user cell at a sender, a receiver, or a relay in an ATM layer, monitors the copy, and measures the traffic of a line that transfers the cell, The test apparatus is capable of simultaneously monitoring user cells sent from two different points, for example, from the sender and receiver of the user cells, and comparing them with each other.

In order to accomplish the above objects, the present invention provides a centralized test apparatus for an ATM exchange system, The test apparatus has an instruction unit for issuing an instruction to test a cell transmitted through a specified line connected to an office unit, which serves as a sender, of the exchange system or through a specified path in the exchange system; a destination changer arranged in the sender, for changing the destination header of the cell according to an instruction from the instruction unit, so that the destination header indicates a tester; a switching unit for guiding the cell to the tester according to the header; and the tester fixed in the exchange system, for centrally monitoring and testing the cell, The tester has a loop unit. The loop unit changes the destination header of the cell to indicate an office unit, which serves as a receiver, of the exchange system, and transfers the cell to the receiver according to an instruction from the instruction unit. As a result, the specified line or path is monitored and tested in real time without disconnecting the sender and receiver from each other.

The loop unit may change the destination header of the cell to indicate the sender and return the cell to the sender according to an instruction from the instruction unit, so that the tester may serve as a dummy receiver and carry out a simulation test on the specified line or path.

The tester may have an extractor for extracting a cell from a specified channel of a frame relay line as well as a framing unit for preparing a frame signal according to the extracted cell. The tester monitors and tests the frame signal. The tester may have a counter for counting the number of cells transmitted through the specified line or path by reading the virtual path identifier (VPI) or virtual channel identifier (VCI) of each cell, to test the traffic of the line or path according to the number. The tester may have a unit for inserting or extracting a cell into br from a specified channel of a frame relay line, and a framing unit for preparing a frame signal according to the cell, to carry out a frame relay simulation test.

The destination changer may have a copying unit for copying a cell transmitted through the specified line or path, The destination changer changes the destination header of only the copy cell to indicate the tester and sends out the cell and copy cell.

The copying unit has a selector for selecting an incoming or outgoing user cell, a collation unit for copying the selected cell if the virtual path identifier or virtual channel identifier of the cell agrees with a reference value, a header changer for changing the header of the copy cell, and a controller. The controller issues a select instruction to the selector according to an instruction from the instruction unit. The controller provides the collation unit with the reference value, a reference count at which a copy is made, or intervals to make copies. The controller provides the header changer with a new header value.

A line or channel to be tested is specified through a console. The instruction unit realized by, for example, exchange control software provides the destination changer with an instruction to change the header (TAG) of a cell transmitted through the specified line or channel, so that the header indicates the tester. According to the header, the switching unit routes the cell to the tester fixed in the exchange system. Unlike the prior art, the present invention never requires a line connection to be opened or the tester to be manually connected to the opened connection. The tester is fixed in the exchange system, to centrally test every line and path.

The copying unit copies a user cell at a sender, receiver, or relay in an ATM layer of the ATM exchange system. The copy cell is monitored by the tester. Namely, the tester may receive a copy cell from a sender to which a specified line or path is connected, from a receiver, or from a relay. The tester may receive a plurality of cells from two office units of the exchange system and compare them with each other.

In this case, the tester measures a cell loss rate, a cell mixture rate, or a bit error rate between the two office units. A dummy user cell may be employed instead of an actual user cell, to correctly carry out a test.

BRIEF DESCRIPTION OF THE DRAWINGS

The present invention will be more clearly understood from the description as set forth below with reference to the accompanying drawings, wherein:

FIG. 2 shows a principle of the present invention;

FIG. 3 shows another principle of the present invention;

FIG. 4 explains the arrangement and operation of an ATM exchange system;

FIG. 5 shows a cell format used by the ATM exchange system;

FIG. 7 shows a table used by the exchange system of FIG. 6, to find an internal channel identifier (ICID-A);

FIG. 8 shows a table used by a virtual channel controller of the exchange system of FIG. 6;

FIG. 15 shows a table for finding an internal channel identifier (ICID-B);

FIG. 16 shows a bit map table for demultiplexing;

FIG. 18 shows a table used by a virtual channel controller;

FIG. 22 shows a third example of monitoring a user cell, according to the present invention; and FIG. 23 shows a fourth example of monitoring a user cell, according to the present invention.

DESCRIPTION OF THE PREFERRED EMBODIMENTS

Figure 1:
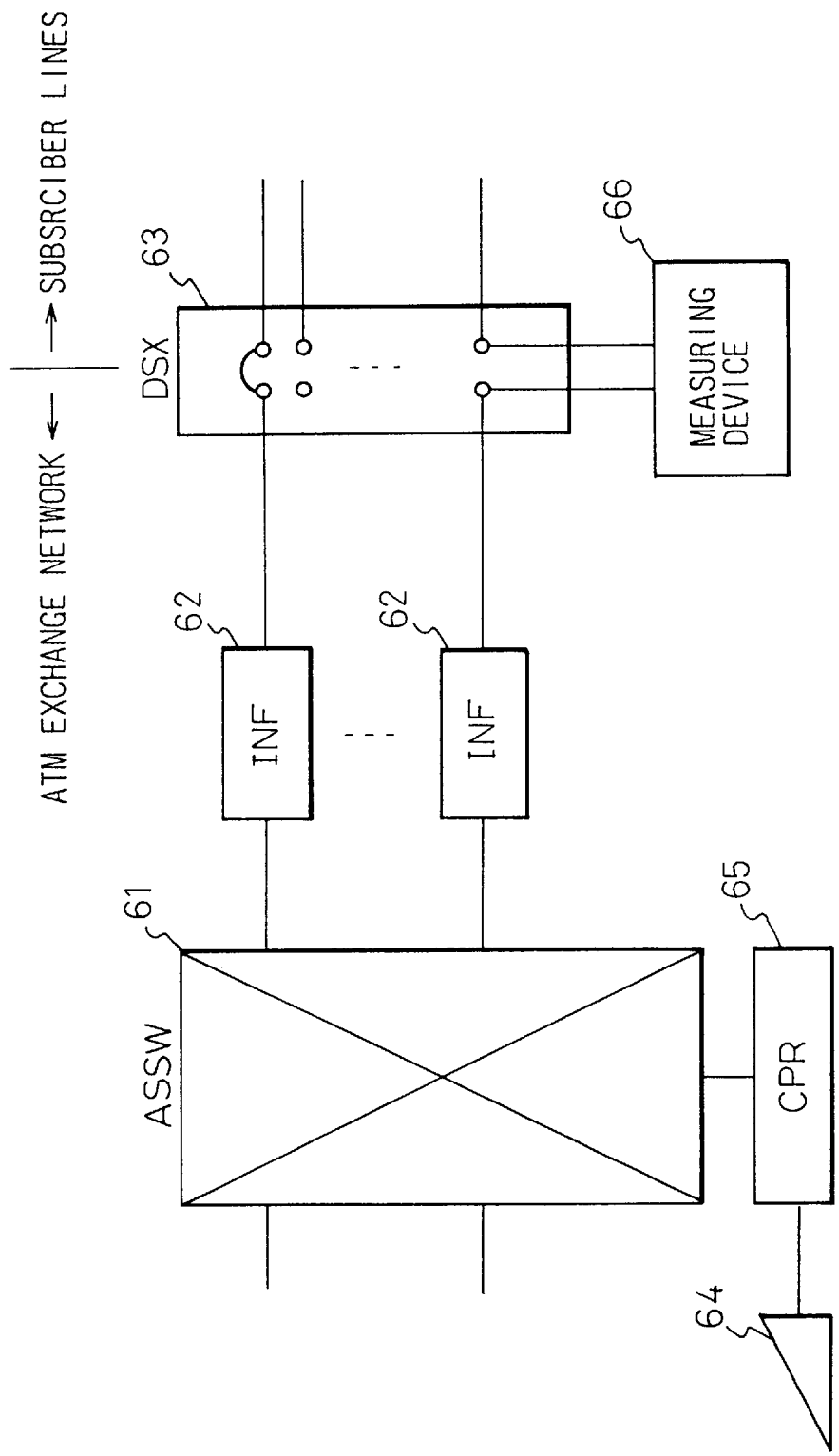
FIG. 1 shows an ATM exchange system according to a prior art.

For a better understanding of the preferred embodiments of the present invention, the problem in the prior art will be explained, FIG. 1 shows an asynchronous transfer mode (ATM) exchange system according to the prior art.

A digital signal cross connector (DSX) 63 corresponds to an MDF of an analog circuit. The cross connector 63 physically terminates optical fiber transmission lines serving as subscriber lines. The subscriber lines are connected to subscriber interfaces 62 of the exchange system through the cross connector 63. An ATM subscriber switch (ASSW) 61 exchanges ATM cells provided by the interfaces 62 according to instructions provided by exchange control software of a call processor (CPR) 65.

A console 64 is used to provide the exchange system with various instructions. To measure one of the subscriber lines (the lowermost one in FIG. 1), the console 64 is used to enter test conditions into the exchange system. The specified line is opened in the cross connector 63, and a measuring device 66 is connected to the opened part.

The console 64 is usually far from the cross connector 63, so that a maintenance person must come and go between them when measuring the subscriber lines. This is inconvenient for the maintenance person. Opening a specified one of the lines in the cross connector 63 and connecting the measuring device 66 to the opened part require manpower. Consequently, the prior art is slow and inefficient for measuring the lines.

Next, preferred embodiments of the present invention will be explained.

FIG. 2 shows a principle of the present invention,

A test instruction unit 102 issues an instruction to a destination changer 101 to change the destination of an input cell 100 so that the cell 100 is transferred to a tester 103. According to the instruction, the destination changer 101 changes the header of the cell 100. According to the header, a switching unit 104 guides the cell 100 to the tester 103. The tester 103 carries out a test on the cell 100 according to an instruction from the instruction unit 102.

The tester 103 has a loop unit 105, which forms a path between the destination changer 101 serving as a sender and a receiver, This realizes a real time monitor test between the sender and the receiver. A simulation test is also possible. In this case, the tester 103 assumes a receiver and sends a test result to the sender through the loop unit 105.

FIG. 3 shows another principle of the present invention.

A destination changer 101 has a copying unit 106 for copying a cell. The copying unit 106 realizes a real time monitor test on a specified line or channel irrelevant to the situations of the line or channel.

FIG. 4 explains the arrangement and operation of an ATM exchange system.

Input cells A and B are transmitted to an individual subscriber interface (INFA) 1. The interface 1 adjusts the cells A and B so that they are switched in an ATM switch (ASSW) 4, and sends the cells to a common unit 2. The common unit 2 has a subscriber storage unit and achieves a virtual channel controller (VCC) function with respect to the cells, The interface 1 and common unit 2 form a subscriber interface shelf (SIFSH).

The VCC function retrieves a tag for an input cell from a VCC table 3 in the common unit 2 according to the virtual path identifier (VPI) or virtual channel identifier (VCI) of the cell. The retrieved tag is added to the header of the cell. In FIG. 4, the cell A has a channel number 30, which is the VPI or VCI, and is provided with a tag of TAG1 according to the VCC table 3. Similarly, the cell B has a channel number 31 and is provided with a tag of TAG2. The VCC table 3 is set by the exchange control software during an initialization period or a call setting period.

The switch 4 routes the cells according to the tags. Namely, the cell A is routed to an individual interface 6 (INFB) according to the tag TAG1, and the cell B to an individual interface 7 (INFC) according to the tag TAG2. The interfaces 6 and 7 transmit data restored from the cells A and B.

FIG. 5 shows an example of a format of a cell used in the ATM exchange system.

The header of the cell is 6 bytes long, one byte longer than a standard ATM cell because of tags. The tags A and B are used by the switch 4 to select a highway. The tag C is used to select a channel in the subscriber interface shelf. A bit C specifies the kind of a communication mode. When the bit C is 0, it is point-to-point communication, and when the bit C is 1, point-to-multipoint communication. A bit U specifies the kind of the cell. When the bit U is 0, the cell is a user cell, and when the bit U is 1, the cell is a test cell used within the exchange system.

Figure 6:
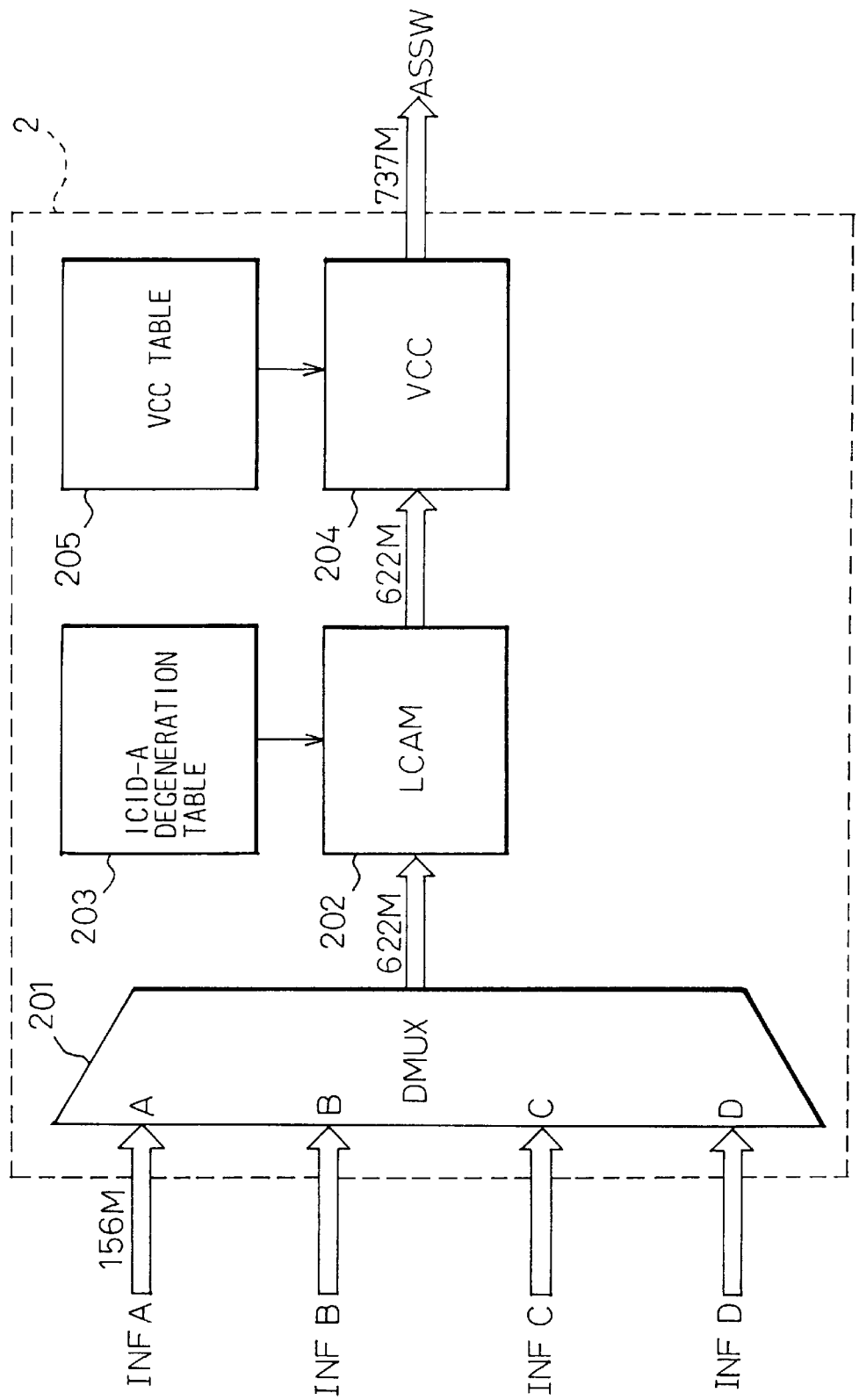
FIG. 6 shows a common unit for point-to-point connection of the ATM exchange system of FIG. 4.

FIG. 6 shows an example of the common unit 2 of FIG. 4 for an incoming direction. The bit C of each cell to the common unit 2 is 0 to indicate point-to-point connection.

FIG. 7 shows an example of an internal-channel-identifier (ICID)-A degeneration table 203 of FIG. 6, and FIG. 8 shows an example of a VCC table 205 of FIG. 6, In FIG. 6, a multiplexer 201 multiplexes signals from individual interfaces INFA to INFD and provides the header of each of the cells with a corresponding line number (LN). An LCAM 202 searches the table 203 for the line number (LN), virtual path identifier (VPI), and virtual channel identifier (VCI) of each cell. It they are found in the table 203, the address thereof is set as an ICID-A value serving as a VCC conversion key. The ICID-A value is added to the header of the cell, which is sent to a virtual channel controller (VCC) 204, In FIG. 7, the LN, VPI, and VCI of a given cell are found at an address 2 in the table 203. Accordingly, the ICID-A value of this cell is 2. In the table 203, a signal EN indicates the validity of set data. When the signal EN is 1, the set data is valid, and when it is 0, the set data is invalid. When ACT- and SBY-based cells are used, the signal EN is used to indicate the validity of one of the cells.

According to the ICID-A value, the virtual channel controller 204 searches the VCC table 205 for a converted tag, VPI, and VCI for the cell, The controller 204 rewrites the header of the cell accordingly and provides the switch 4 with the cell.

In FIG. 8, the ICID-A value of 2 of the cell is used as an address of the VCC table 205, to find the converted tag, VPI, and VCI of the cell, and the found values are written in proper positions in the format of FIG. 5 of the cell.

Figure 9:
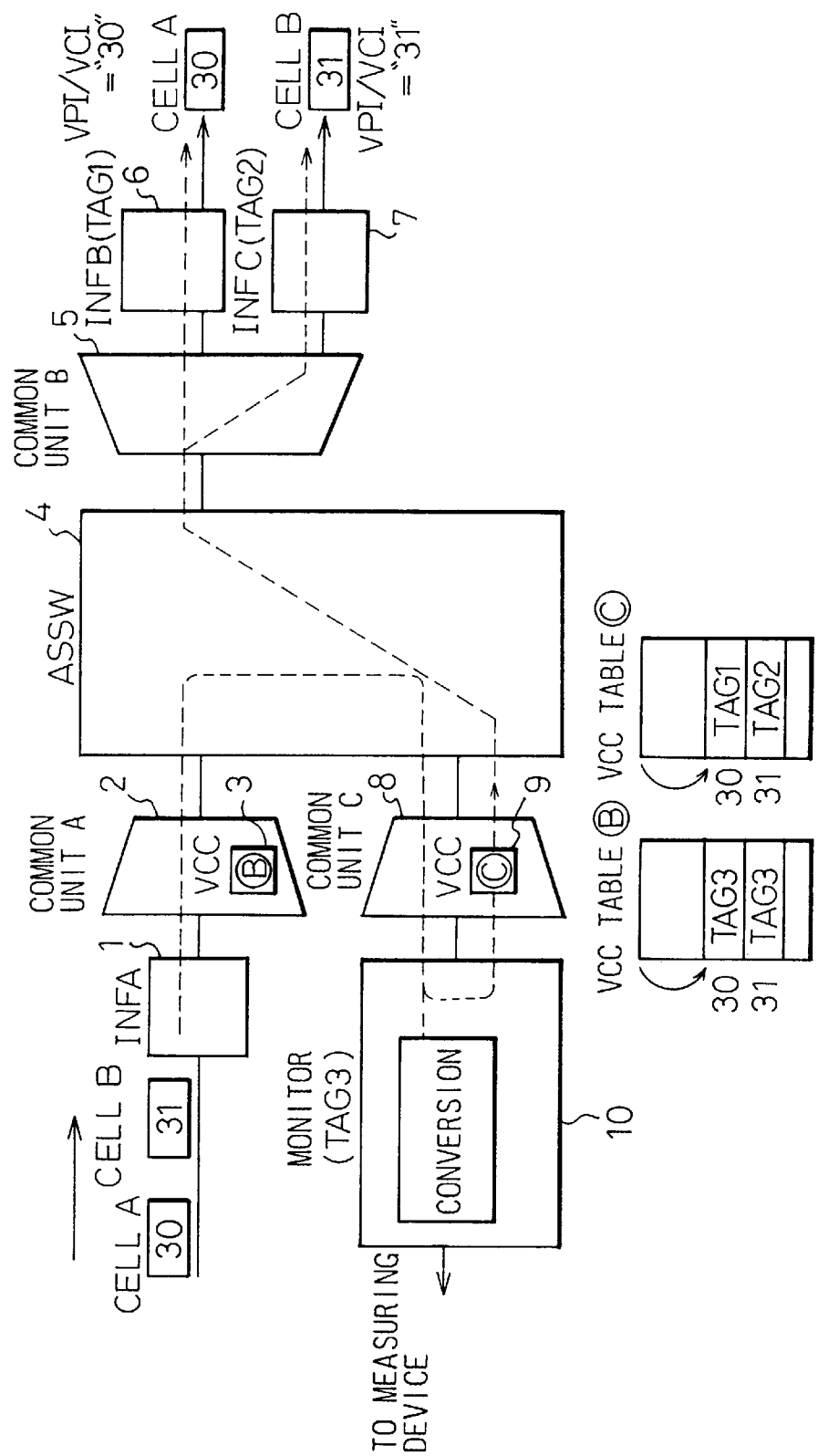
FIG. 9 shows a monitor for centrally testing a specified line, according to the present invention.

FIG. 9 shows a centralized test apparatus employing a monitor according to the present invention.

Compared with the arrangement of FIG. 4, the arrangement of FIG. 9 additionally has a common unit 8 and the monitor 10. The same reference marks as those of FIG. 4 represent like parts, Input cells A and B are sent to an individual interface 1 (INFA). The cells A and B are passed through an ATM switch (ASSW) 4 and routed to individual interfaces 6 and 7 (INFB and INFC), respectively.

To monitor the cells A and B in the interface 1, exchange control software rewrites the tags TAG1 and TAG2 of the cells A and B each into a tag TAG3 according to a VCC table 3 of a common unit 2 so that the cells A and B are sent to the monitor 10 through the common unit 8. Thereafter, the cells A and B are routed from the monitor 10 to the interfaces 6 and 7, respectively. Namely, the exchange control software rewrites the tags of the cells A and 8 to the tags TAG1 and TAG2 according to a VCC table 9 of the common unit 8.

Upon receiving the cells A and B, the monitor 10 converts the formats of the cells A and B so that the cells are measured by an external measuring device, Then, the cells A and B from the monitor 10 are routed to the interfaces 6 and 7, respectively, according to the tags stored in the VCC table 9, The monitor 10 is fixed in the exchange system, to easily monitor an optional line in real time. Cells to be tested are routed like the example of FIG. 4, A line to be tested is directly specified through a console, and the exchange control software rewrites the VCC tables when starting a test.

Figure 10:
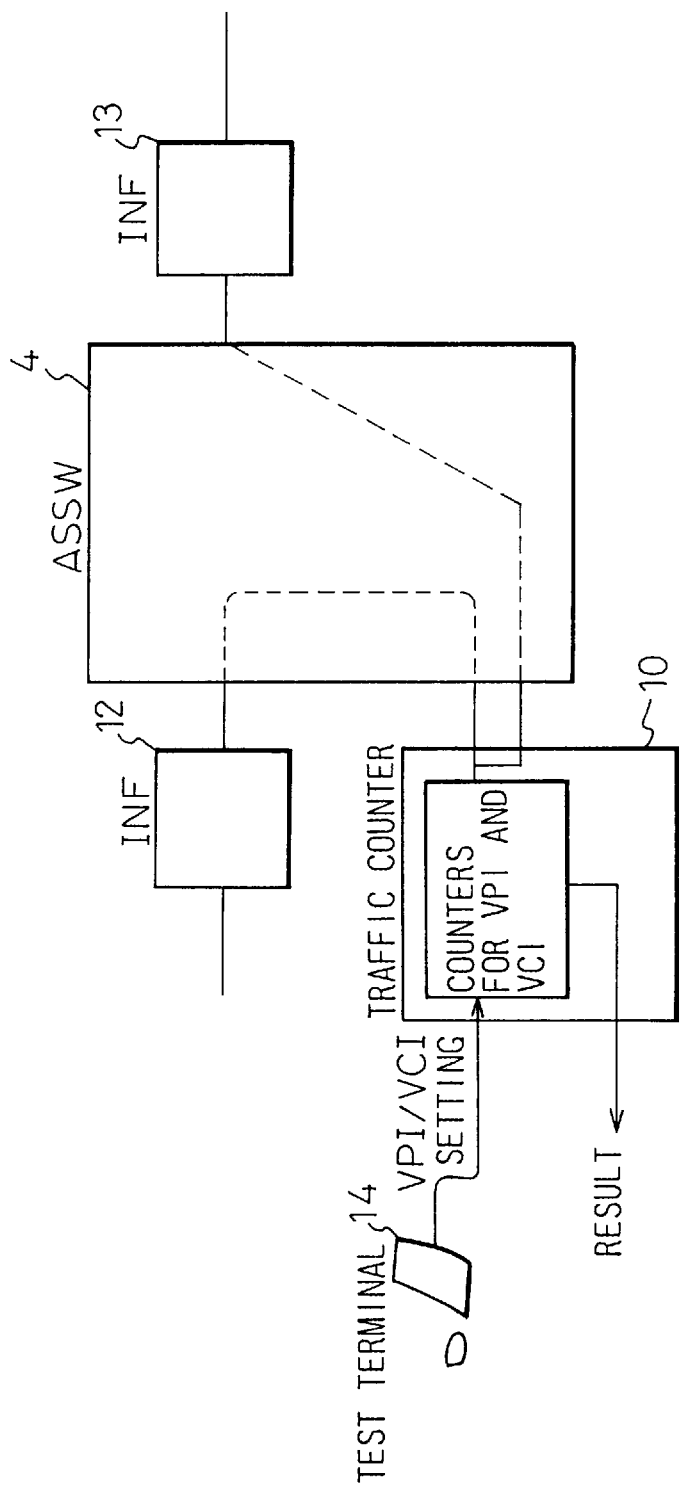
FIG. 10 shows an arrangement for carrying out a traffic test in the apparatus of FIG. 9.

FIG. 10 shows a traffic test carried out by the arrangement of FIG. 9.

Subscriber interface shelves 12 and 13 each include an individual interface and a common unit such as those shown in FIG. 9. A traffic counter 10 includes the common unit 8 and VCC function. A test terminal 14 is a workstation or a personal computer, which is used to specify the VPI and VCI of each cell transmitted through a line to be monitored.

The traffic counter 10 counts the number of cells having the specified VPI and VCI. According to the count, the traffic counter 10 calculates the busy rate of the line and statistical data, which are transferred to an external device. The traffic counter 10 loops the cells and rewrites tags in the headers of the cells, FIG. 11 shows a centralized test apparatus employing a simulator according to the present invention.

Figure 11:
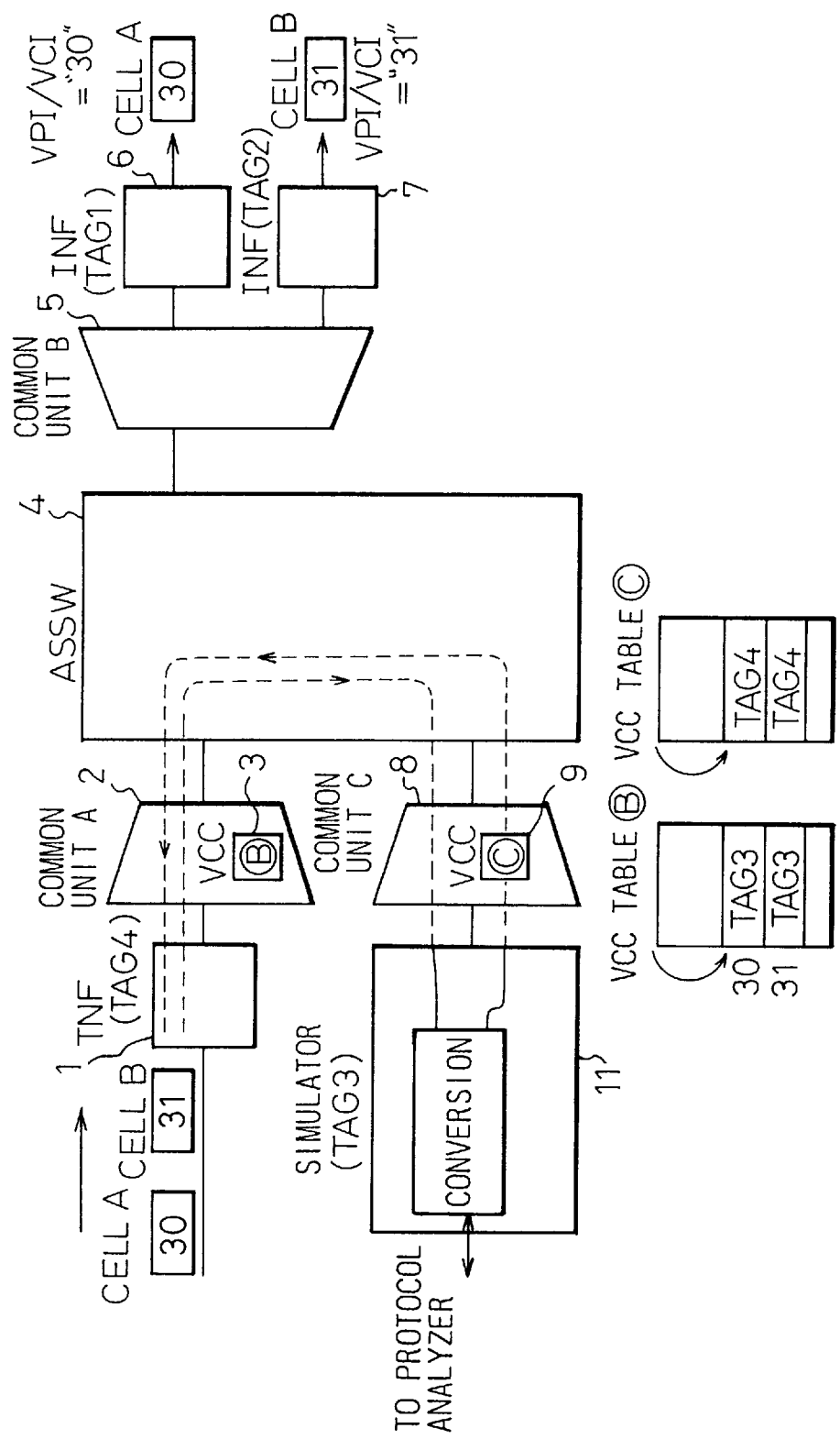
FIG. 11 shows a simulator for centrally testing a specified line, according to the present invention.

The apparatus of FIG. 11 employs the simulator 11 instead of the monitor 10 of FIG. 9. The other parts of FIG. 11 are the same as those of FIG. 9.

In FIG. 11, exchange control software rewrites the tags TAG1 and TAG2 of input cells A and B each into a tag TAG3 according to a VCC table 3 of a common unit 2 so that the cells A and B are sent to the simulator 11 through a common unit 8. To send a simulation result of each of the cells A and B from the simulator 11 to an interface 1, the exchange control software rewrites the tags of the cells A and B each into a tag TAG4, which indicates the interface 1, according to a VCC table 9 of the common unit 8.

The simulator 11 converts the formats of the cells A and B and provides an external protocol analyzer with the converted data. The protocol analyzer simulates the operations of, for example, common unit 5 and individual interfaces 6 and 7, and returns the cells A and B as responses to the interface 1.

The simulator 11 is fixed in the exchange system, An optional line to be tested is specified through a console, and the operation of the line is correctly simulated to diagnose the line.

Figure 12:
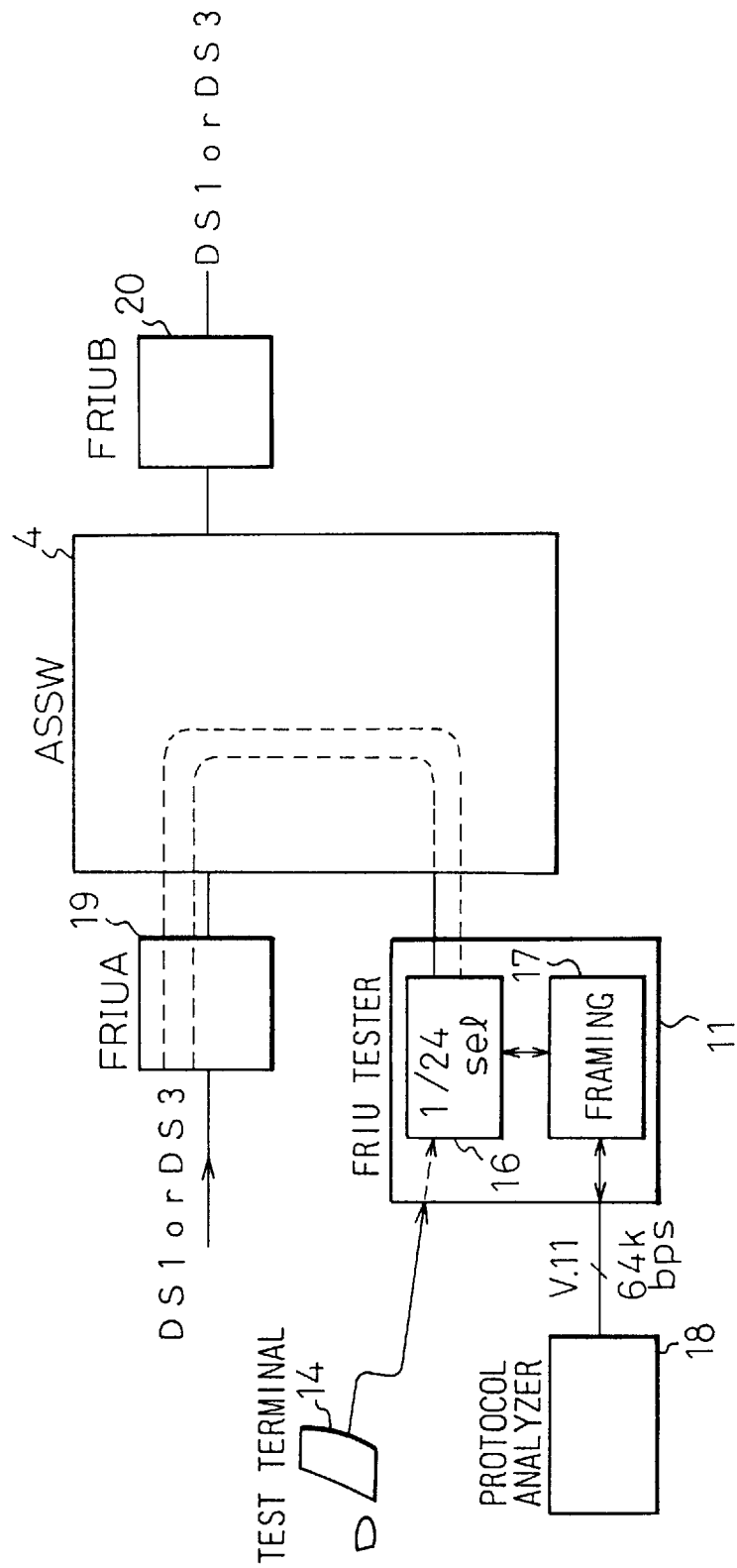
FIG. 12 shows an arrangement for carrying out a frame relay test in the apparatus of FIG. 11.

FIG. 12 shows a frame relay test carried out by the arrangement of FIG. 11.

Frame relay interface units 19 and 20 (FRIUA and FRIUB) are connected to a DS1 line of 1.5 Mb/s in data transmission speed, or a DS3 line of 45 Mb/s in data transmission speed. Each of the interface units 19 and 20 has an individual interface and a common unit such as those shown in FIG. 11. A frame relay interface tester 11 has the common unit 8 and VCC function of FIG. 11, A channel to be tested by the tester 11 is specified through a test terminal 14.

To simulate a specified channel between the interface units 19 and 20, the tester 11 establishes a route from the interface unit 19 to the tester 11. A 1/24 channel selector 16 selects one among 24 channels of the DS1 line. A framing unit 17 prepares frames of channel data for the selected channel. The frames are transferred to a protocol analyzer 18 through an electric interface such as V.11 at a transmission speed of 64 Kb/s.

The protocol analyzer 18 carries out a simulation test with respect to the interface unit 19 according to the frames. A result of the test is returned to the interface unit 19. In this case, the VCC function is used to rewrite a tag in the header of each cell to be returned.

Figure 13:
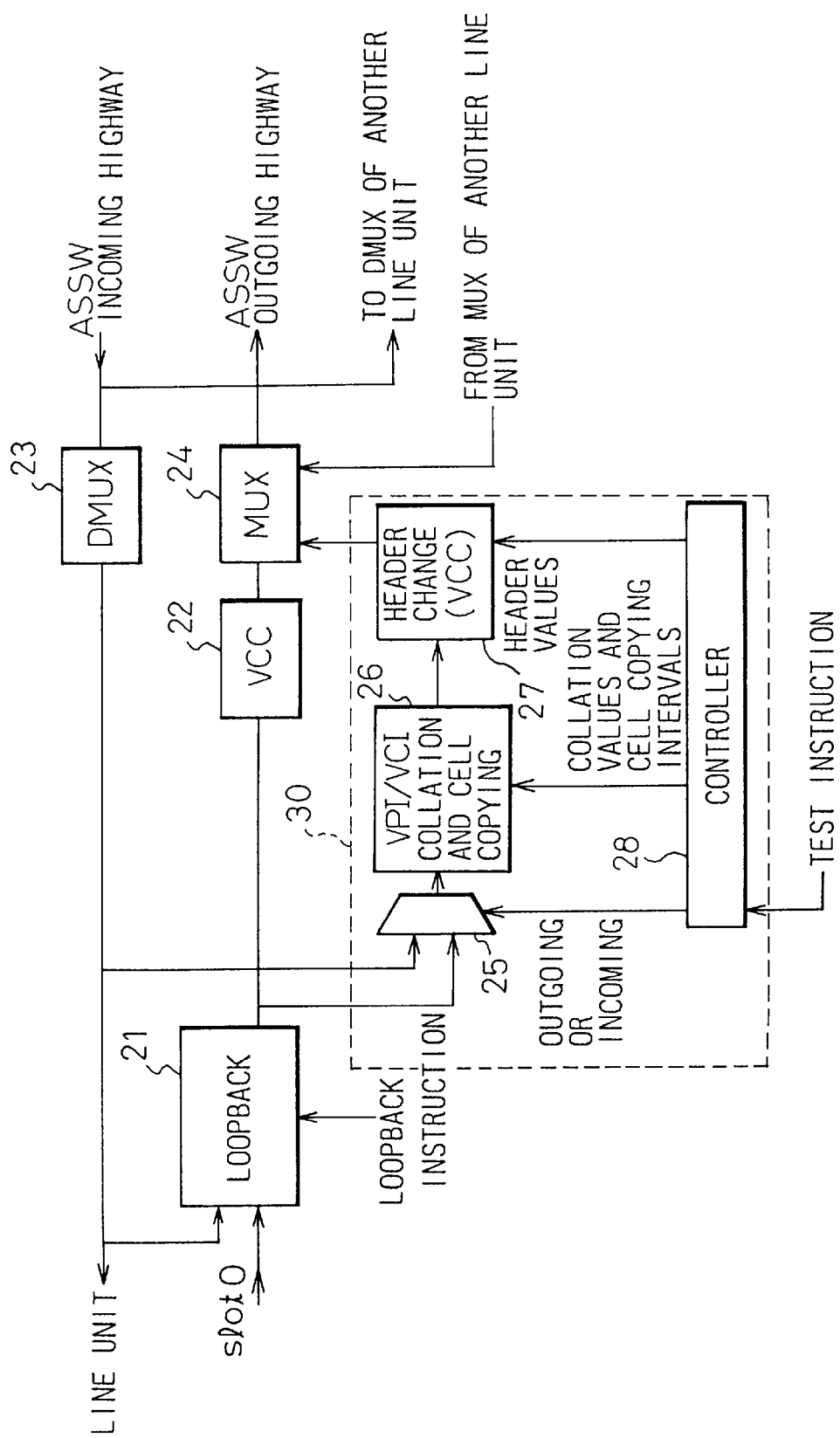
FIG. 13 shows a common unit for copying a user cell and transferring the copy to a tester, according to the present invention.

FIG. 13 shows a common unit for copying a user cell and transferring the copy to a tester. The common unit may be any one of the common units 2 and 5 of FIG. 4.

A demultiplexer (DMUX) 23 identifies a tag in the header of each cell among incoming highway data from an ATM switch (ASSW), and fetches the cell accordingly. The demultiplexer 23 separates the incoming highway data into data for an individual interface (INF) and data for a common unit in a subscriber interface shelf (SIFSH). In this way, each cell is identified according to a tag in the header of the cell.

A virtual channel controller (VCC) 22 is the same as that of FIG. 4, and therefore, it is not explained again. A multiplexer 24 multiplexes data from 8 subscriber cards (slots 0 to 7) of the subscriber interface and signaling data from the common unit, to prepare outgoing highway data to the ATM switch.

A copying unit 30 according to the present invention is indicated with a dotted line in FIG. 13. The copying unit 30 has a controller 28. The controller 28 controls a selector 25 in response to an external test instruction, to select the direction of a user cell to be copied. A collation and copying unit 26 collates the VPI and VCI of a cell with reference values, and if they agree with each other, copies the cell. The controller 28 provides the unit 26 with the reference values, the number of coincident cells to be counted to make a copy, or copying intervals. The controller 28 provides a header changer 27 achieving the VCC function with a header value to route a copy cell to a tester.

Figure 14:
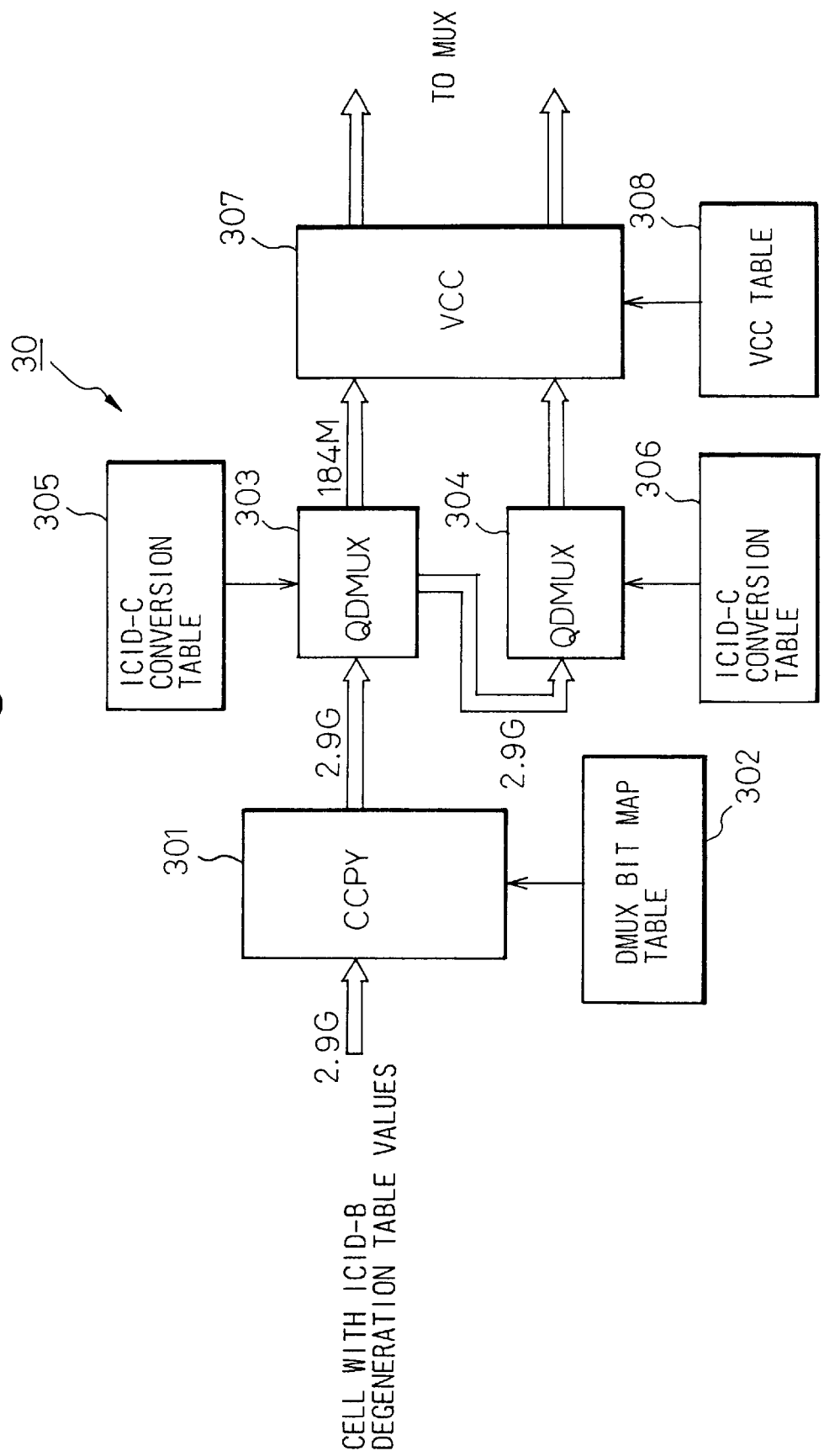
FIG. 14 shows a point-to-multipoint example of the copying unit of FIG. 13.

FIG. 14 shows an example of the copying unit 30 of FIG. 13 for point-to-multipoint connection with the bit C (FIG. 5) of each cell being 1.

Figure 17:
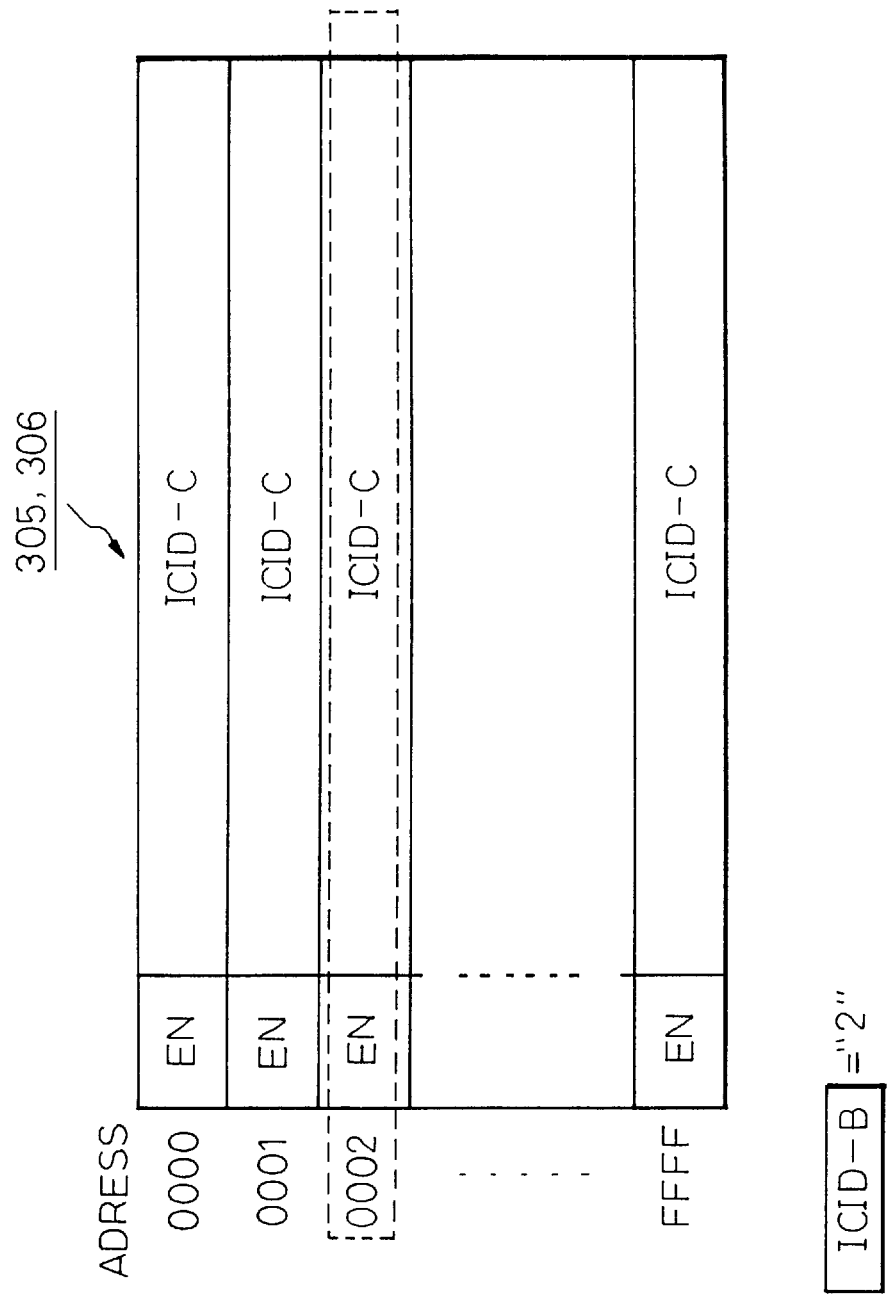
FIG. 17 shows a table for finding an internal channel identifier (ICID-C)

FIGS. 15 to 18 are conversion tables used for the, point-to-multipoint connection, in which FIG. 15 shows an ICID-S conversion table, FIG. 15 shows a demultiplex bit map table, FIG. 17 shows an ICID-C conversion table, and FIG. 18 shows a VCC table.

Finding the ICID-A value of a cell has been explained with reference to FIGS. 6 and 7. A given cell is supposed to have an ICID-A value of 2 as in the case of FIG. 7. When the bit C of the cell is 1 to indicate point-to-multipoint connection, a tag and an ICID-B value serving as a conversion key for a copying process are obtained from the ICID-B conversion table of FIG. 15.

A CCPY unit 301 of FIG. 14 checks the demultiplex bit map table 302 (FIG. 16) with the ICID-B value serving as an address. In FIG. 16, the ICID-B value is 2, which is used to check the table 302. Highway values thus found are inserted in the header of the cell.

Any one of QDMUX 303 and QDMUX 304 fetches the cell if a corresponding one of the highway values (HWxx) obtained from the table 302 is 1. If the highway values corresponding to the QDMUX 303 and QDMUX 304 are each 1, the cell is transmitted to each of them. Due to the copying function, the same cell can be transmitted to a plurality of lines.

The QDMUX 303 and QDMUX 304 use the ICID-B value as an address to find an ICID-C value from the ICXO-C conversion tables 305 and 306 of FIG. 17, The ICID-C value is inserted in the header of the cell, which is sent to a virtual channel controller (VCC) 307. The VCC 307 employs the ICID-C value as an address to check the VCC table 308 of FIG. 18 and provides outputs VPI and VCI.

In FIG. 18, the ICID-C value is 1. According to this ICID-C value, outputs VPI and VCI are obtained at the address 001 of the VCC table 308. A next address value N-ADD in a data retrieval chain is 2. Since an end flag E-F at the address 001 is 0 to indicate that the process is incomplete, another pair of outputs VPI and VCI is obtained at the address 002 of the VCC table 308. Similarly, still another pair of outputs VPI and VCI is obtained at the address 003 of the VCC table 308. An end flag at the address 003 is 1 to indicate that the process is complete, and therefore, the table retrieval process ends.

Unlike the process of copying a cell for a plurality of lines, the three output cells are sequentially provided to a single line with the obtained VPIs and VCIs. In this way, the present invention realizes a function of copying a single cell for a single line.

These copying functions enable a specified user cell to be copied according to a test instruction and be transferred to a tester through an ATM switch (ASSW) at once. It is possible, therefore, to monitor a specified line or a group of lines in real time by the centralized test apparatus fixed in the exchange system.

Figure 19:
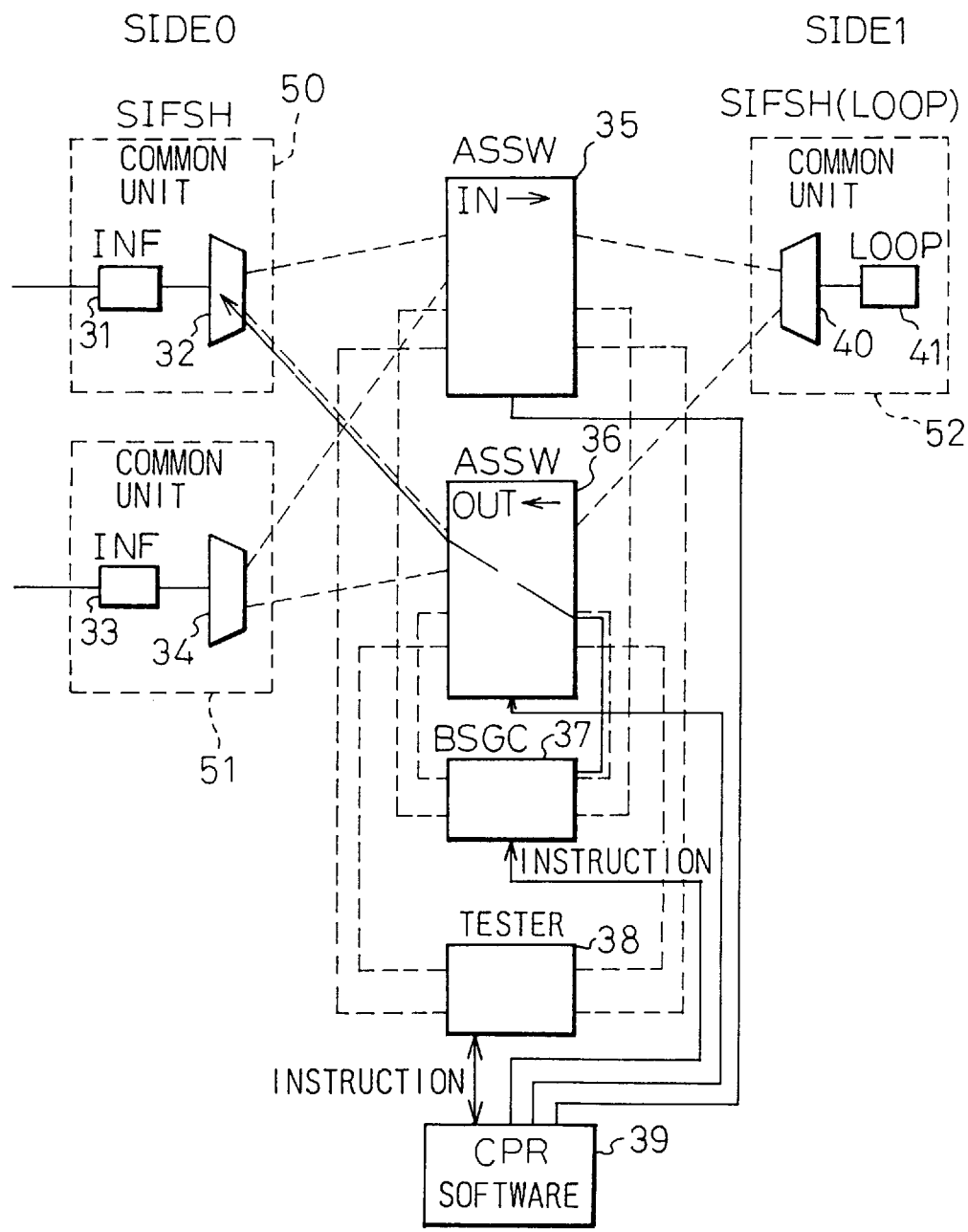
FIG. 19 shows a method of sending a test instruction to a common unit.

FIG. 19 shows an example of sending a test instruction to a common unit.

ATM switches (ASSWs) 35 and 36 work for IN and OUT directions, respectively, Subscriber interface shelves (SIFSHs) 50 to 52 have common units 32, 34, and 40 and individual interfaces 31, 33, and 41, respectively. The interface 41 has a loop card for routing a cell to the switches 35 and 36.

Each of the common units 32, 34, and 40 has a VCC function in an outgoing direction as explained with reference to FIG. 13.

A call processor (CPR) 39 has software to control a broad-band signaling controller (BSGC) 37, which sends a test instruction to the common units 32, 34, and 40. The call processor 39 is interfaced with a tester 38 and sends test start, test end, and test result notices to the tester 38.

When a test instruction is given to the common unit 32 of the interface shelf 50, a copy cell is sent from the common unit 32 to the tester 38, as explained with reference to FIG. 13. According to an instruction from the call processor 39, the tester 38 provides a result of monitoring, for example, the traffic of a specified line.

FIGS. 20 to 23 show examples of monitoring user cells according to the present invention. The same reference marks as those of FIG. 19 represent like parts, which are not explained again.

Figure 20:
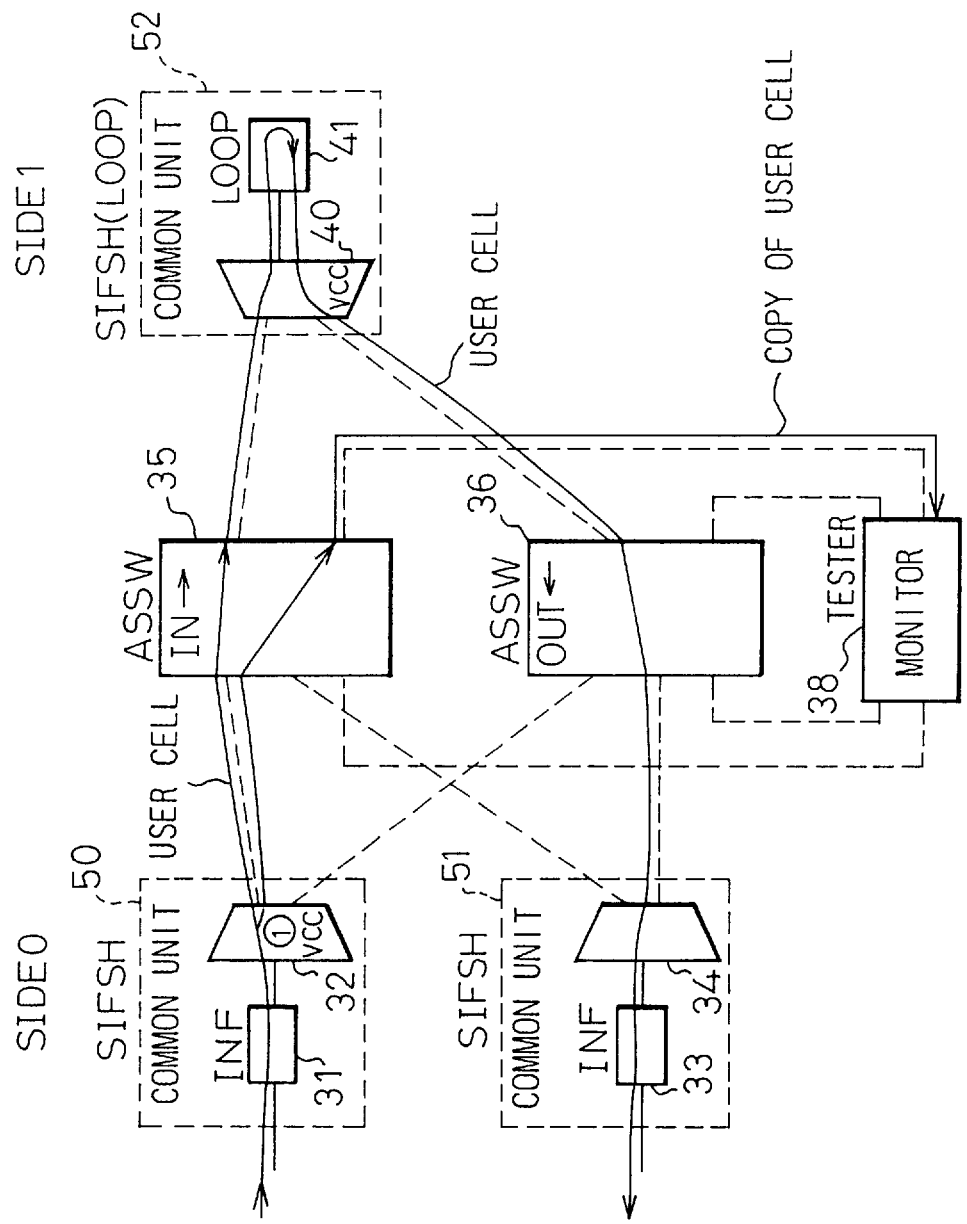
FIG. 20 shows a first example of monitoring a user cell, according to the present invention.

In FIG. 20, the loop function of the interface shelf 52 is used to send a user cell from the interface 31 of the interface shelf 50 to the interface 33 of the interface shelf 51. In response to an instruction produced by the exchange control software, a user cell is copied by the common unit 32. Instead, a user cell may be copied by the interface 31.

A tag in the header of the copy cell is rewritten by the ATM switch 35 so that it is routed to the tester 38. Instead of directly inserting the tag in the header of the copy cell, the bit U (FIG. 5) of the copy cell may be changed to "1" to indicate a test cell. When the VCC function of the common unit 32 detects the test cell, it rewrites the tag of the copy cell to indicate the tester 38. Upon receiving the copy cell, the tester 38 monitors the cell or measures the traffic of a corresponding line.

Figure 21:
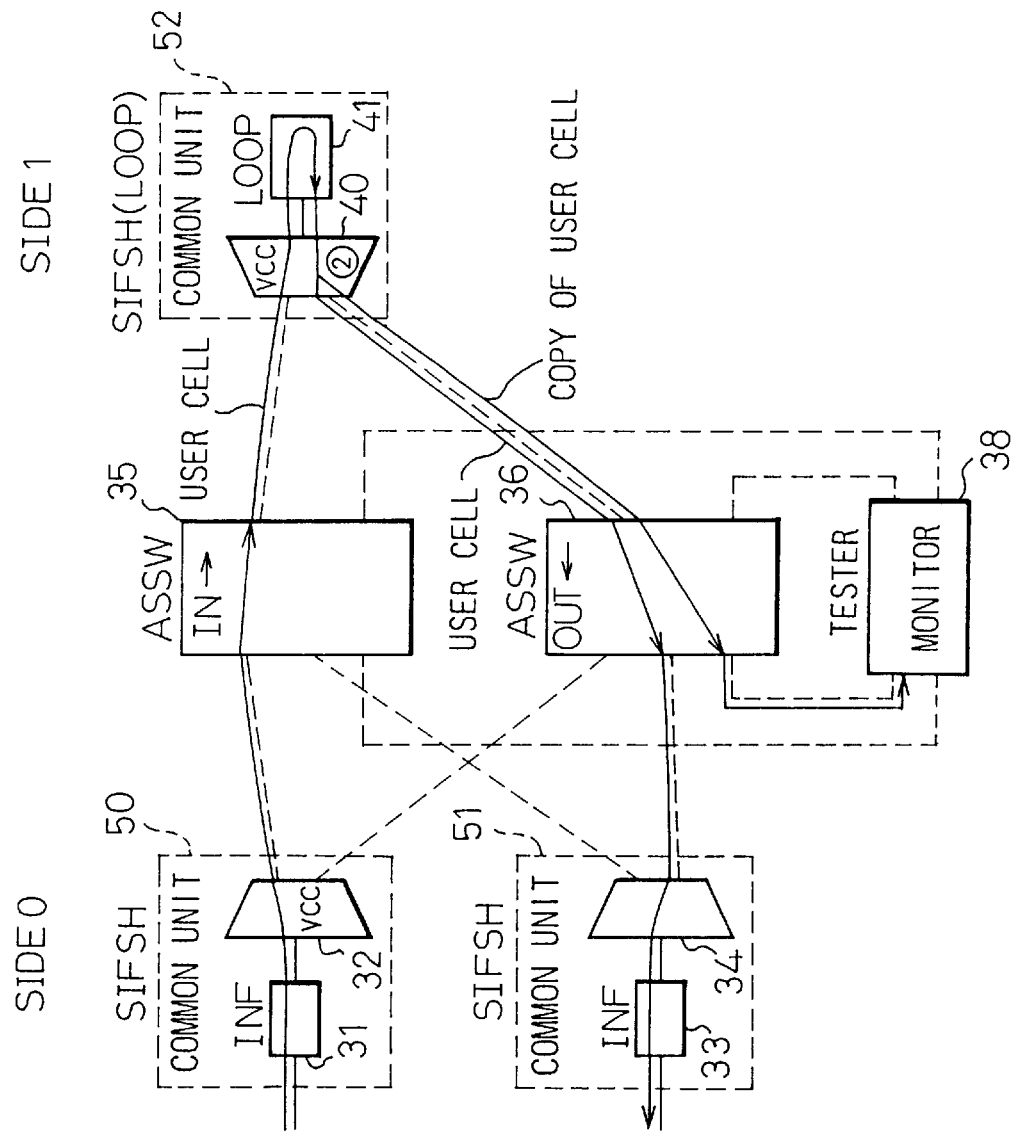
FIG. 21 shows a second example of monitoring a user cell, according to the present invention.

In FIG. 21, the interface shelf 52 serves as a relay in which the common unit 40 copies a user cell and transfers the copy cell to the tester 38.

In FIG. 22, the interface shelf 51 serves as a receiver in which the common unit 34 copies a user cell and transfers the copy cell to the tester 38. In this case, the copy cell must be transmitted first to the ATM switch 35 for the IN direction.

As explained above, user cells may be monitored not only at a single location but also at a plurality of locations simultaneously.

In FIG. 23, user cells at a sender (the interface shelf 50) and a receiver (the interface shelf 51) are simultaneously monitored. This is a combination of the examples of FIGS. 20 and 22. Copy cells provided by the sender and receiver are separately transferred to the tester 38. The tester 38 compares the number of sent cells with the number of received cells, to correctly measure a cell loss rate, a cell mixture rate, a bit error rate, etc., in real time. In this case, there must be no cell loss, no mixture, nor bit error in the routes for sending the copy cells from the sender and receiver to the tester 38.

User cells may be monitored during a given period as explained with reference to the controller 28 of FIG. 13. Alternatively, one cell may be sent to the tester after counting a predetermined number of cells. For example, whenever 1000 cells are counted, one cell is transferred for monitoring. In this way, a variety of settings are possible to roughly or precisely measure the traffic of a line.

Instead of monitoring user cells, test cells generated by an artificial call generator may be employed. Such test cells are looped back by a test cell loop unit and are monitored.

As explained above, the present invention enables a maintenance person to specify a line or a channel to test and automatically fetch cells from the line, to monitor the line or carry out a simulation test on the line. The present invention fixes a monitor in an ATM exchange system, to easily monitor an optional line in real time without influencing the routing of cells. The present invention fixes a simulator in an ATM exchange system, to correctly and independently simulate the operation of an optional line and efficiently diagnose the line.

The present invention is capable of monitoring user cells at a sender, a receiver, or a relay in an ATM layer of an ATM exchange system, to precisely measure the traffic of an optional line. The present invention is capable of monitoring user cells at two locations and comparing them with each other, to calculate a cell loss rate, a cell mixture rate, a bit error rate, etc.

When a large quantity of cells exceeding a prescribed quantity are transmitted, usage parameter control (UPC) works to abandon the cells. To deal with this, the present invention is capable of measuring the traffic of any line and the peak velocity and mean velocity of user cells transmitted through the line. This is impossible for the prior art to achieve.

We claim:

1. A centralized test apparatus for an ATM exchange system, comprising:

test means connected to the exchange system for centrally monitoring and testing at least one ordinary ATM cell transferred through lines or paths of the exchange system in normal operation;

instruction means for issuing an instruction to specify the at least one cell to be tested;

destination change means for changing, according to the instruction from the instruction means, a destination header of the specified at least one cell to be tested, and adding routing information to the cell by using a table for rewriting the destination header so that the destination header indicates the test means; and switching means for guiding the specified at least one cell to the test means according to the header.

2. The test apparatus according to claim 1, wherein the test means has loop means for changing the destination header of the cell to indicate an office unit, which serves as a receiver, of the exchange system and transferring the cell to the receiver according to an instruction from the instruction means, so that the specified line or path is monitored and tested in real time without disconnecting the sender and receiver from each other.

3. The test apparatus according to claim 2, wherein the test means has count means for counting the number of cells transmitted through the specified line or path by reading the virtual path identifier or virtual channel identifier of each cell, and tests the traffic of the line or path according to the number.

4. The test apparatus according to claim 1, wherein the test means has loop means for changing the destination header of the cell to indicate the sender and returning the cell to the sender according to an instruction from the instruction meats, so that the test means serves as a dummy receiver and carries out a simulation test on the specified line or path.

5. The test apparatus according to claim 1, wherein the test means has count means for counting the number of cells transmitted through the specified line or path by reading the virtual path identifier or virtual channel identifier of each cell, and tests the traffic of the line or path according to the number.

6. The test apparatus according to claim 1, wherein the destination change means has means for copying a cell transmitted through the specified line or path according to an instruction from the instruction means, changes a destination header of only the copy cell to indicate the test means, and sends out the cell and copy cell.

7. The test apparatus according to claim 6, wherein the copying means copies cells transmitted through the specified line or path at predetermined intervals.

8. The test apparatus according to claim 6, wherein the copying means copies a cell transmitted through the specified line or path whenever a predetermined number of cells are detected in the line or path.

9. The test apparatus according to claim 6, wherein the test means monitors a copy cell from one of the sender, receiver, and relay.

10. The test apparatus according to claim 6, wherein the test means receives copy cells from two office units of the exchange system and compares the received cells with each other.

11. The test apparatus according to claim 10, wherein the test means measures a cell loss rate, a cell mixture rate, or a bit error rate according to a result of the comparison.

12. The test apparatus according to claim 11, wherein a dummy user cell is used in place of the cell transmitted through the specified line or path.

13. The test apparatus according to claim 10, wherein a dummy user cell is used in place of the cell transmitted through the specified line or path.

14. A centralized test apparatus for an ATM exchange system, comprising:

test means fixed in the exchange system for centrally monitoring and testing a cell;

instruction means for issuing an instruction to test a cell transmitted through a specified line connected to the exchange system or through a specified path in the exchange system;

destination change means for changing a destination header of the cell to be tested and adding routing information to the cell, by using a table for rewriting the destination header according to an instruction from the instruction means, so that the destination header indicates the test means; and switching means for guiding the cell to the test means according to the header, wherein the test means has extraction means for extracting a cell from a specified channel of a frame relay line and framing means for preparing a frame signal according to the extracted cell, and monitors and tests the frame signal.

15. A centralized test apparatus for an ATM exchange system, comprising:

test means fixed in the exchange system for centrally monitoring and testing a cell;

instruction means for issuing an instruction to test a cell transmitted through a specified line connected to the exchange system or through a specified path in the exchange system;

destination change means for changing a destination header of the cell to be tested and adding routing information to the cell, by using a table for rewriting the destination header according to an instruction from the instruction means, so that the destination header indicates the test means; and switching means for guiding the cell to the test means according to the header, wherein the test means has loop means for changing the destination header of the cell to indicate the sender and returning the cell to the sender according to an instruction from the instruction means, so that the test means serves as a dummy receiver and carries out a simulation test on the specified line or path, and wherein the test means has means for inserting or extracting a cell to or from a specified channel of a frame relay line and framing means for preparing a frame signal according to the cell, to carry out a frame relay simulation test.

16. A centralized test apparatus for an ATM exchange system, comprising:

test means fixed in the exchange system for centrally monitoring and testing a cell;

instruction means for issuing an instruction to test a cell transmitted through a specified line connected to the exchange system or through a specified path in the exchange system;

destination change means for changing a destination header of the cell to be tested and adding routing information to the cell, by using a table for rewriting the destination header according to an instruction from the instruction means, so that the destination header indicates the test means; and switching means for guiding the cell to the test means according to the header, wherein the destination change means has means for copying a cell transmitted through the specified line or path according to an instruction from the instruction means, changes a destination header of only the copy cell to indicate the test means, and sends out the cell and copy cell, and wherein the copying means has selection means for selecting an incoming or outgoing user cell, collation means for copying the selected cell if the virtual path identifier or virtual channel identifier of the cell agrees with a reference value, means for changing a header of the copy cell, and control means for issuing a select instruction to the selection means according to an instruction from the instruction means, providing the collation means with the reference value, a reference count at which a copy is made, or intervals to make copies, and providing the header change means with a new header value.

17. A centralized test apparatus for an ATM exchange system, comprising:

test means fixed in the exchange system for centrally monitoring and testing a cell;

instruction means for issuing an instruction to test a cell transmitted through a specified line connected to the exchange system or through a specified path in the exchange system;

destination change means for changing a destination header of the cell to be tested and adding routing information to the cell, by using a table for rewriting the destination header according to an instruction from the instruction means, so that the destination header indicates the test means; and switching means for guiding the cell to the test means according to the header.

wherein the test means has loop means for changing the destination header of the cell to indicate an office unit, which serves as a receiver, of the exchange system and transferring the cell to the receiver according to an instruction from the instruction means, so that the specified line or path is monitored and tested in real time without disconnecting the sender and receiver from each other, and wherein the test means has extraction means for extracting a cell from a specified channel of a frame relay line, and framing means for preparing a frame signal according to the extracted cell, and monitors and tests the frame signal.

18. A centralized test apparatus for an ATM exchange system, comprising:

test means fixed in the exchange system for centrally monitoring and testing a user cell;

instruction means for issuing an instruction to test a user cell transmitted through a specified line connected to the exchange system or through a specified path in the exchange system;

destination change means for changing a destination header of the user cell to be tested and adding routing information to the user cell, by using a table for rewriting the destination header according to an instruction from the instruction means, so that the destination header indicates the test means; and switching means for guiding the user cell to the test means according to the changed header.

* * * * *